Aug. 5, 1952

R. J. SMITHISLER 2,605,779

PRESSURE AND VACUUM RELIEF VALVE

Filed April 20, 1948

INVENTOR.
RAYMOND J. SMITHISLER
BY
Bosworth + Sessions
ATTORNEYS

Patented Aug. 5, 1952

2,605,779

UNITED STATES PATENT OFFICE 2,605,779

PRESSURE AND VACUUM RELIEF VALVE

Raymond J. Smithisler, Kirtland Township, Lake County, Ohio, assignor to The Chester Heater Manufacturing Co., Chesterland, Ohio, a corporation of Ohio Application April 20, 1948, Serial No. 22,162

10 Claims. (Cl. 137—73)

This invention relates to pressure relief valves particularly adapted for use in domestic hot water systems.

For the sake of safety, it is desirable to provide domestic hot water systems with pressure relief valves which will open to discharge water or steam from the system in the event of excessive pressures. It is also desirable to provide valves which will open if the water in the system approaches the boiling point. For the sake of convenience in draining and refilling hot water systems, it is desirable to provide valves which will open to admit air into the systems as the pressure in the systems approaches atmospheric pressure, and which will also function to vent air from the systems when they are being refilled.

The present invention has for its general object the provision of a simple and reliable pressure relief valve which will also function as a vacuum relief valve and vent to admit air into the system and discharge it from the system. Another object is the provision of such a valve which can be adapted to act as a temperature relief valve, opening when the water in the system exceeds a predetermined temperature. Another object is to provide a valve which will positively open to relieve pressure substantially at the pressure for which it is set and which will not corrode or freeze shut. A further object is the provision of such a valve which will act to relieve the effects of water hammer in hot water systems. Another object is the provision of such a valve which can be readily adjusted to operate at different pressures. A further object is the provision of such a valve which can be economically manufactured and easily installed.

Figure 1:
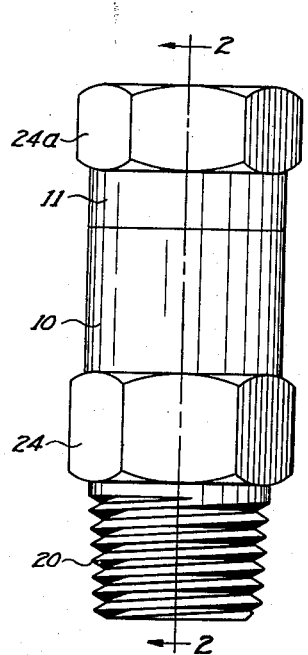
Figure 2:
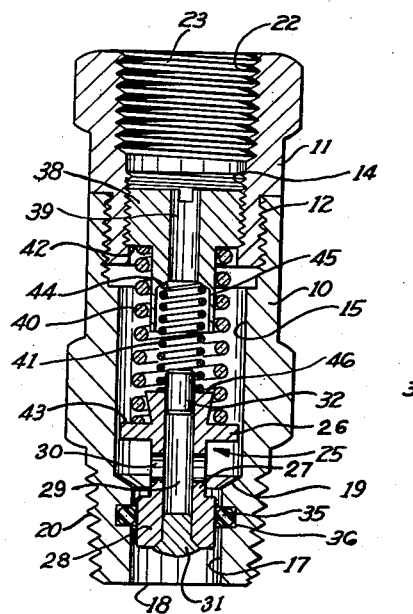
Figure 5:
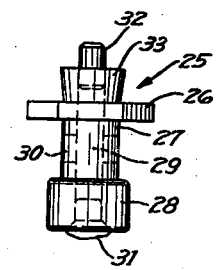
Figure 6:
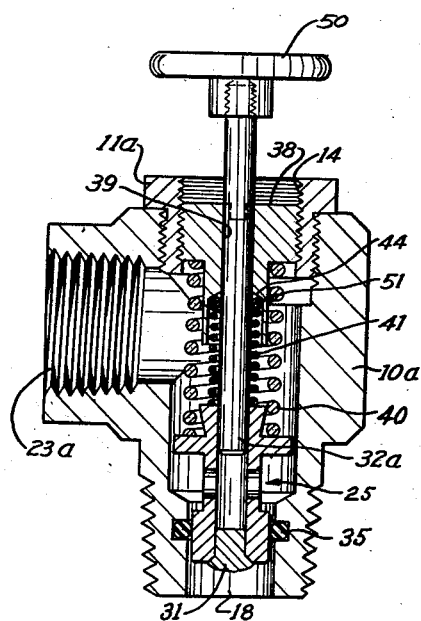
Figure 3:
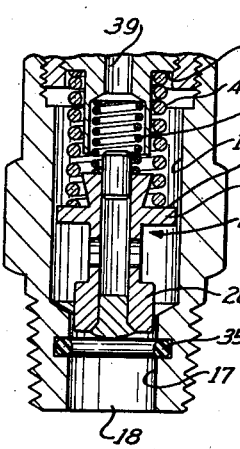
Figure 4:
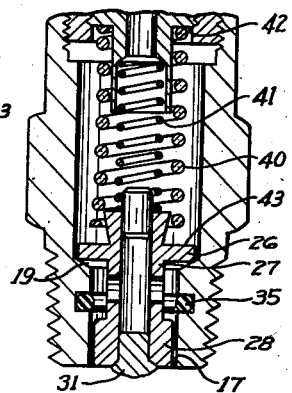

Further objects and advantages of the invention will become apparent from the following description of a preferred form thereof, reference being made to the accompanying drawings in which Figure 1 is an elevational view of one form of valve made according to my invention; Figure 2 is a longitudinal cross section through the valve of Figure 1 showing the position of the parts under normal operating pressure conditions; Figure 3 is a fragmentary section similar to Figure 2 but showing the position of the parts under excessively high pressure conditions; Figure 4 is a similar section showing the position of the parts under abnormally low pressure conditions such as occur when the system is being drained; Figure 5 is a detail showing a preferred form of valve member; and Figure 6 is a section through a modified form of valve embodying my invention showing the parts in the position they take under normal pressure conditions.

Referring particularly to Figures 1 and 2, a valve made according to my invention comprises a body made up of members 10 and 11 screwed together as at 12 and providing within the body an elongated central bore having a threaded portion 14, an enlarged intermediate portion 15 and a cylindrical portion 17 adjacent the inlet 18 and joined to the intermediate portion by a shoulder 19. The exterior of the valve body adjacent the inlet 18 is provided with pipe threads 20 for convenience in connection into a domestic hot water system, or any other convenient means of connection may be employed. At the opposite end of the valve body the member 11 is internally threaded as at 22 to provide means for connecting the outlet 23 of the valve to a drain or the like. Members 10 and 11 have external hexagonal surfaces 24 and 24a, respectively, for engagement with wrenches. The configuration of members 10 and 11 is such that they can be rapidly and economically manufactured from hexagonal bar stock on automatic screw machines.

In order to control the flow of fluid through the valve, a valve member indicated in general at 25 is employed (see Figure 5). Valve member 25 preferably is made of stainless steel, and comprises a hexagonal guiding portion 26 disposed within the enlarged portion 15 of the valve bore, an intermediate portion 27 of reduced diameter and a cylindrical portion 28 which acts as the valve proper and is disposed within the cylindrical portion 17 of the valve bore. A passageway 29 extends through the valve member, and a cross bore 30 connects the passageway 29 with the space surrounding the reduced portion 27. The end of the passageway 29 adjacent the inlet is closed by a fusible plug 31, while the inner end of the passageway is closed by a guide pin 32 pressed therein. As will appear more fully below, melting of the fusible plug under excessively high temperature conditions permits fluid to flow through the valve. Obviously, the plug 31 and cross bore 30 may be omitted if protection against excessive temperatures is not desired. A spring guiding flange 33 concentric with the valve body projects from the hexagonal head portion 26 in the opposite direction from the reduced portion 27.

As shown in Figure 2, there is a clearance space between the cylindrical portion 28 of the valve and the reduced portion 17 of the bore. In order to create a seal between these parts, I preferably employ a conventional O-ring seal 35, composed of a natural or synthetic rubber or rubber-like material compounded to withstand the tempertures to be encountered in service, disposed in an outwardly extending groove 36 in the cylindrical bore 17, the O-ring projecting inwardly sufficiently to make sealing engagement with the cylindrical portion 28 of the valve member 25 so long as the valve member is in a normal service position within the valve body such as indicated in Figure 2.

In order to maintain the valve member with the cylindrical portion 28 thereof in engagement with the O-ring seal 35 under normal pressure conditions and yet to permit it to be moved inwardly out of engagement with the seal as shown in Figure 3 under excessive pressures and to be moved outwardly out of engagement with the seal as shown in Figure 4 under substantially reduced pressures, I employ spring means acting between the valve member 25 and the adjusting screw 38; the adjusting screw is threaded in the portion 14 of the valve body, and has a central passage 39 therethrough to provide a passageway for fluid to flow between intermediate bore 15 and the outlet 23. The spring means comprises a relatively stiff outer spring 40 having a short range of action and a relatively weak inner spring 41 having a longer range of action. Both springs act in compression and in the same direction; the spring 40 acts between the shoulder 42 on the adjusting screw 38 and the inner face 43 of the hexagonal portion 26 of the valve body, and the inner spring 41 acts between the internal shoulder 44 formed in the hollow guide stem 45 of the adjusting screw and the radial end face 46 of the portion 33 of the valve member surrounding the guide 32. Both springs tend to urge the valve member 25 outwardly toward the inlet 18 and to resist inward motion of the valve member. However, in normal operation, the principal resisting force is furnished by the outer spring 40.

The action of the springs may be controlled by the adjusting screw 38 which is adjusted to a position such that the cylindrical portion 28 of the valve member is retained in sealing engagement with the seal 35 against the action of fluid pressure exerted at the inlet 18 so long as such pressure is above the predetermined minimum pressure but not in excess of the predetermined maximum pressure which may, for example, be of the order of 100 to 125 pounds per square inch in an ordinary domestic hot water system. When the maximum pressure is exceeded, the valve member 25 is moved against the action of the springs to the position shown in Figure 3, in which position fluid can flow past the O-ring seal 35, through the clearance space between the cylindrical portion 38 of the valve member and the cylindrical bore 17 then through the clearance spaces between the hexagonal guide 26 and the enlarged bore 15 and out through the passage 39 in the adjusting screw to the outlet 23.

In the event of an abnormal reduction in pressure, the inner spring 41 moves the valve member 25 to a position such as that shown in Figure 4 in which the reduced portion 27 of the valve member is disposed adjacent the seal 35, thus permitting fluid to flow into the valve through the outlet 23, the passage 39, around the hexagonal guide 26, past the seal 35 and reduced portion 27, and through the clearance space between the cylindrical portion 28 and the bore 17. Preferably, the tension of the spring 41 is such that the cylindrical portion 28 is moved out of engagement with the seal 35 to open the valve when the pressure at the inlet is reduced to about 5 pounds above atmospheric pressure, thus opening the valve as a vent before any vacuum is created in the system. The opening pressure varies somewhat with adjustment of the adjusting screw 38, but the variation is not great because the light spring 41 has a low rate. It is to be noted that in the position in Figure 4 the relatively stiff outer spring 40 is disengaged from the shoulder 43 (or from the shoulder 42 on the adjusting screw), and thus the opening of the valve under reduced pressure conditions is controlled by the lighter spring 41, the relatively stiff spring 40 becoming substantially ineffective before the valve member 25 has moved outwardly sufficiently to entirely disengage the cylindrical surface 28 from the seal 35.

In service, the valve is preferably installed at the top of the ordinary domestic hot water tank where it is subjected to the pressures and temperatures of the hot water within the tank. Under normal operating conditions, the valve member 25 takes a position such as shown in Figure 2, the pressure of the water within the tank holding the valve member against the action of the springs. The pressures in the hot water tank fluctuate with changes in city water pressure and when faucets are opened in the system, and the valve member moves to a slightly different position with each material change in pressure at the inlet 18. Thus, the valve member frequently moves with respect to the seal 35. This frequent movement eliminates the possibility of the valve member becoming stuck or frozen in position, and the working of the seal keeps the material of the seal in good condition and insures long life. Also, the valve member moves in response to sudden increases in pressure resulting from the sudden closing of a valve or faucet and thus reduces or eliminates water hammer.

If the pressure exceeds the predetermined maximum, the valve member moves to the position shown in Figure 3, permitting discharge of water from the system and reducing the pressure to the normal value, whereupon the valve member automatically moves back into the engagement with the seal 35 and shuts off the discharge of water. If the temperature in the system exceeds the predetermined value, for example 210° F., the fusible plug 31 melts, and water is discharged through the bore 29, the cross bore 30 and through the head 26 and through the passageway 39 to the outlet 23. Such discharge of hot water from the tank results in the admission of cold water from the supply pipe to the tank, thus eliminating the danger of an explosion by reason of excessive pressures and temperatures within the tank.

If it is desired to drain the tank, the reduction in pressure in the tank incident to drainage permits the spring 41 to move the valve member to a position such as shown in Figure 4, admitting air to the tank and facilitating drainage of the system. The hexagonal head 26 and shoulder 19 limit outward movement of the valve. The valve remains in the position shown in Figure 4 until sufficient pressure is built up in the tank to move the valve member into engagement with the seal 35. Air is vented through the valve during the operation of refilling the tank after drainage. When the water reaches the valve, however, the pressure in the system immediately increases, and after a slight spurt of water from the valve, the valve closes against the action of the springs 40 and 41 taking a position such as that shown in Figure 2. Thus, the valve acts as a pressure and temperature relief valve, as a vacuum relief valve and as an air vent.

In Figure 6, a modified form of valve is illustrated. The mode of operation of the valve of Figure 6 is identical with the valve previously described, and the same reference characters have been applied to corresponding parts. In this form of the invention, however, the body member 10a is in the form of an elbow providing for lateral discharge of water through the outlet 23a, and the body member 11a is reduced in size, as its principal function is to support the adjusting screw 38. Also, in this modification, the guide stem 32a is extended through the bore 39 of the adjusting screw 38 to the exterior of the valve where it is provided with an actuating button 50. Leakage of fluid around the stem 32a is prevented by an O-ring seal 51 disposed within the stem 45 between the spring 41 and the shoulder 44 of the adjusting screw 38. With this form of valve, the valve member 25 may be pushed downwardly manually by means of the button 50 acting through the stem 32a to open the valve.

In both modifications of my invention, the pressures may be adjusted by varying the position of the adjusting screw 38 in the threaded bore 14. Also in both forms of the invention, the valve may be disassembled for cleaning or servicing without disturbing this adjustment merely by unscrewing the member 11 or 11a as the case may be from the member 10 or 10a. When this is done, the valve member may be removed from the bore, the springs 40 and 41 may be removed, and the O-ring may be removed or replaced. When the member 11 or 11a, as the case may be, is replaced to its former position, the tension on the springs 40 and 41 will be the same as before so long as the position of the adjusting screw 38 is not changed with respect to the threads 14.

From the foregoing description of preferred forms of my invention, it will be seen that I have provided simple and effective pressure, vacuum and temperature relief valves which provide positive protection to domestic hot water systems against excessive pressures and temperatures and which also open under reduced pressure to assist in drainage of the systems and to provide for venting the systems upon refilling. The component parts of my valves can be manufactured easily and at relatively low cost, the parts can be assembled accurately and economically, and the valves can be installed readily without requiring special tools or equipment.

Various changes and modifications in my invention will be apparent to those skilled in the art. It is therefore to be understood that my patent is not limited to the preferred form of the invention disclosed herein or in any manner other than by the scope of the appended claims.

I claim:

1. A combined pressure and vacuum relief valve comprising a valve body having a bore having a threaded portion adjacent one end thereof, an intermediate guide portion, and an end portion of reduced diameter, there being a shoulder between said guide portion and said end portion, an O-ring seal seated in said end portion of said bore, the internal diameter of said O-ring being less than the diameter of said end portion, a piston valve member disposed in said bore and having an enlarged hexagonal head disposed in said intermediate guide portion of said bore, a cylindrical portion disposed in said end portion of said bore and adapted to engage said O-ring seal and a reduced portion between said hexagonal head and said end portion, there being a clearance space between said cylindrical portion and said end portion which clearance space is normally blocked by said O-ring seal, spring means within said body urging said hexagonal head toward said shoulder, said valve member being movable inwardly toward said intermediate portion against the action of said spring means in response to excessive fluid pressure applied thereto to disengage said cylindrical end portion from said O-ring seal to permit flow of fluid through said valve, and being movable outwardly of said intermediate portion by said spring means in response to reduced pressure to position said reduced portion adjacent said O-ring seal to permit flow of fluid through said valve, and an adjusting screw disposed in the threaded portion of said valve body for adjusting the action of said spring means.

2. A combined pressure and vacuum relief valve comprising a valve body having a bore, said body being made up of two members threaded together, one of said members providing a threaded portion of said bore adjacent one end thereof, the other of said members providing an intermediate guide portion of said bore, and an end portion of said bore of reduced diameter, there being a shoulder between said guide and end portions, an O-ring seal seated in said end portion of said bore, the internal diameter of said O-ring being less than the diameter of said end portion, a piston valve member disposed in said bore and having an enlarged hexagonal head disposed in said intermediate guide portion of said bore, a cylindrical portion disposed in said end portion of said bore and adapted to engage said O-ring seal and a reduced portion between said hexagonal head and said end portion, there being a clearance space between said cylindrical portion and said end portion which clearance space is normally blocked by said O-ring seal, spring means within said bore urging said hexagonal head toward said shoulder, said valve member being movable inwardly toward said intermediate portion against the action of said spring means in response to excessive fluid pressure applied thereto to disengage said cylindrical end portion from said O-ring seal to permit flow of fluid through said valve, and being movable outwardly of said intermediate portion by said spring means in response to reduced pressure to position said reduced portion adjacent said O-ring seal to permit flow of fluid through said valve, and an adjusting screw disposed in the threaded portion of said first member of said valve body for adjusting the action of said spring means.

3. A combined pressure and vacuum relief valve comprising a valve body having a bore having a threaded portion adjacent one end thereof, an intermediate guide portion, and an end portion of reduced diameter, there being a shoulder between said guide portion and said end portion, an O-ring seal seated in said end portion of said bore, the internal diameter of said O-ring being less than the diameter of said end portion, a piston valve member disposed in said bore and having an enlarged hexagonal head disposed in said intermediate guide portion of said bore, a cylindrical portion disposed in said end portion of said bore and adapted to engage said O-ring seal and a reduced portion between said hexagonal head and said end portion, there being a clearance space between said cylindrical portion and said end portion which clearance space is normally blocked by said O-ring seal, spring means within said body urging said hexagonal head toward said shoulder, said valve member being movable inwardly toward said intermediate portion against the action of said spring means in response to excessive pressure applied thereto to disengage said cylindrical end portion from said O-ring seal to permit flow of fluid through said valve, and being movable outwardly of said intermediate portion by said spring means in response to reduced pressure to position said reduced portion adjacent said O-ring seal to permit flow of fluid through said valve, said spring means comprising a relatively stiff spring adapted to resist inward movement of said valve member and a relatively weak spring adapted to urge said valve member outwardly to position said reduced portion adjacent said O-ring, said relatively stiff spring ceasing to act on said valve member before said valve member is moved outwardly a sufficient distance to disengage the cylindrical portion thereof from said O-ring seal.

4. A combined pressure and vacuum relief valve comprising a valve body having a bore having an inlet and an outlet, a cylindrical portion adjacent the inlet, an enlarged portion adjacent the cylindrical portion, there being a shoulder between the cylindrical portion and the enlarged portion, a valve member disposed in said bore and having an enlarged head disposed in the enlarged portion of said bore, a cylindrical portion disposed in the cylindrical portion of said bore, and a reduced portion disposed between said enlarged and cylindrical portions, there being clearance between said portions of said valve member and adjacent portions of said bore, sealing means disposed in said cylindrical portion of said bore and adapted to engage said cylindrical portion of said valve member to block the clearance space therebetween, spring means in said valve body tending to move said valve member outwardly toward said inlet and to disengage the cylindrical portion thereof from said sealing means, fluid pressure in said inlet tending to move said valve member inwardly to disengage said cylindrical portion from said sealing means, said spring means comprising a relatively stiff spring adapted to resist inward movement of said valve member and a relatively weak spring adapted to urge said valve member outwardly to position said reduced portion adjacent said sealing means, said relatively stiff spring ceasing to act on said valve member before said valve member is moved outwardly a sufficient distance to disengage the cylindrical portion thereof from said sealing means.

5. A combined pressure and vacuum relief valve comprising a valve body having a bore having an inlet and an outlet, sealing means in said bore, the internal diameter of said sealing means being less than the diameter of the adjacent portion of said bore, a piston valve member disposed in said bore and having a cylindrical portion adapted to engage said sealing means, there being a clearance space between said cylindrical portion and said bore which clearance space is normally blocked by said sealing means, spring means within said body urging said valve member outwardly toward said inlet, said valve member being movable inwardly against the action of said spring means in response to excessive pressure applied thereto to disengage said cylindrical portion from said sealing means to permit flow of fluid through said valve and being movable outwardly by said spring means in response to reduced pressure in said inlet to disengage said cylindrical portion from said sealing means to permit flow of fluid through said valve, said spring means comprising a relatively stiff spring adapted to resist inward movement of said valve member and a relatively weak spring adapted to urge said valve member outwardly of said intermediate portion, said relatively stiff spring ceasing to act on said valve member before said valve member is moved outwardly a sufficient distance to disengage the cylindrical portion thereof from said sealing means.

6. A combined pressure and vacuum relief valve comprising a valve body having a bore having an inlet and an outlet, an O-ring seal seated in said bore, the internal diameter of said O-ring being less than the diameter of the adjacent portion of said bore, a piston valve member disposed in said bore and having a cylindrical portion adapted to engage said O-ring seal, there being a clearance space between said cylindrical portion and said bore which clearance space is normally blocked by engagement of said cylindrical portion and said O-ring seal, the axial length of said cylindrical portion being greater than the axial thickness of said O-ring seal whereby limited axial movement of said valve member may take place while the cylindrical portion thereof remains in sealing engagement with said O-ring seal, spring means within said body urging said valve member outwardly toward said inlet, said valve member being movable inwardly against the action of said spring means in response to excessive pressure applied thereto to disengage said cylindrical portion from said O-ring seal to permit flow of fluid through said valve and being movable outwardly by said spring means in response to reduced pressure to disengage said cylindrical portion from said O-ring seal to permit flow of fluid through said valve.

7. A combined pressure and vacuum relief valve comprising a valve body having a bore having an inlet and an outlet, a valve member disposed in said bore and having a cylindrical portion, there being clearance between said cylindrical portion of said valve member and the adjacent portion of said bore, an O-ring seal disposed in said bore and adapted to engage said cylindrical portion of said valve member to block the clearance space therebetween, spring means in said valve body tending to move said valve member outwardly toward said inlet and to disengage the cylindrical portion thereof from said O-ring seal, fluid pressure in said inlet tending to move said valve member inwardly to disengage said cylindrical portion from said O-ring seal, said spring means comprising a relatively stiff spring adapted to resist inward movement of said valve member and a relatively weak spring adapted to urge said valve member outwardly, both said springs acting in the same direction, said relatively stiff spring ceasing to act on said valve member before said valve member is moved outwardly a sufficient distance to disengage the cylindrical portion thereof from said O-ring seal.

8. A combined pressure, vacuum and temperature relief valve comprising a valve body having a bore having an inlet and an outlet, a cylindrical portion adjacent the inlet and an enlarged portion adjacent the cylindrical portion, there being a shoulder between the cylindrical portion and the enlarged portion, a valve member disposed in said bore and having an enlarged head disposed in the enlarged portion of said bore, a cylindrical portion disposed in the cylindrical portion of said bore, and a reduced portion disposed between said enlarged and cylindrical portions, there being clearance between said portions of said valve member and adjacent portions of said bore, said valve member having a passage extending from the end of the cylindrical portion thereof to said reduced portion and a fusible plug disposed in said passage, sealing means disposed in said cylindrical portion of said bore and adapted to engage said cylindrical portion of said valve member to block the clearance space therebetween, spring means in said valve body tending to move said valve member toward said inlet and to disengage the cylindrical portion thereof from said sealing means, fluid pressure in said inlet tending to move said valve member in the opposite direction to disengage said cylindrical portion from said sealing means.

9. A combined pressure and vacuum relief valve comprising a valve body having a bore having an inlet and an outlet, a valve member disposed in said bore and having a cylindrical portion, there being clearance between said cylindrical portion of said valve member and the adjacent portion of said bore, an O-ring seal disposed in said bore and adapted to engage said cylindrical portion of said valve member to block the clearance space therebetween, the axial length of said cylindrical portion being greater than the axial thickness of said O-ring seal whereby limited axial movement of said valve member may take place while the cylindrical portion thereof remains in sealing engagement with said O-ring seal, spring means in said valve body tending to move said valve member toward said inlet and to disengage the cylindrical portion thereof from said O-ring seal, fluid pressure in said inlet tending to move said valve member in the opposite direction to disengage said cylindrical portion from said O-ring seal.

10. A combined pressure, vacuum and temperature relief valve comprising a valve body having a bore having an inlet and an outlet, a valve member disposed in said bore and having a cylindrical portion of substantial length, there being clearance between said cylindrical portion of said valve member and the adjacent portion of said bore, sealing means disposed in said bore and adapted to engage said cylindrical portion of said valve member to block the clearance space therebetween, spring means in said valve body acting in a single direction and tending to move said valve member toward said inlet and to disengage the cylindrical portion thereof from said sealing means, fluid pressure in said inlet tending to move said valve member in the opposite direction to disengage said cylindrical portion from said sealing means, said valve member having a passageway through the cylindrical portion thereof and by-passing said sealing means, said passageway being blocked by a fusible plug.

RAYMOND J. SMITHISLER.

REFERENCES CITED

The following references are of record in the file of this patent:

UNITED STATES PATENTS

| Number | Name | Date |
|---|---|---|
| 633,707 | Swartz | Sept. 26, 1899 |
| 911,603 | Miller | Feb. 9, 1909 |
| 1,087,890 | Rogers | Feb. 17, 1914 |
| 1,401,002 | Smith | Mar. 19, 1929 |
| 1,705,941 | Moody | Mar. 19, 1929 |
| 1,756,133 | Parker | Apr. 29, 1930 |
| 1,798,536 | Hofmann | Mar. 31, 1931 |
| 2,360,733 | Smith | Oct. 17, 1944 |